US009263813B2

(12) United States Patent
Pavageau et al.

(10) Patent No.: US 9,263,813 B2
(45) Date of Patent: Feb. 16, 2016

(54) SYSTEM FOR PROTECTING A SIGNAL WITHIN AN ELECTRONIC DEVICE, RELYING ON AN INSERTION OF A PRINTED CIRCUIT IN AN INSERTION SLOT OF A CONNECTOR

(71) Applicant: Compagnie Industrielle et Financiere D'Ingenierie "Ingenico", Paris (FR)

(72) Inventors: Stephane Pavageau, La Roche de Glun (FR); Eric Bonnet, Malissard (FR)

(73) Assignee: INGENICO GROUP, Paris (FR)

( * ) Notice: Subject to any disclaimer, the term of this patent is extended or adjusted under 35 U.S.C. 154(b) by 10 days.

(21) Appl. No.: 14/247,857

(22) Filed: Apr. 8, 2014

(65) Prior Publication Data
US 2014/0308823 A1 Oct. 16, 2014

(30) Foreign Application Priority Data

Apr. 12, 2013 (FR) .................. 13 53320

(51) Int. Cl.
*H01R 12/00* (2006.01)
*H05K 1/00* (2006.01)
*H01R 12/72* (2011.01)
*G06F 21/86* (2013.01)
*G06K 7/00* (2006.01)

(52) U.S. Cl.
CPC ............ *H01R 12/72* (2013.01); *G06F 21/86* (2013.01); *G06K 7/0091* (2013.01)

(58) Field of Classification Search
CPC ....... H01R 12/72; G06F 21/86; G06K 7/0091
USPC .......................... 439/62, 61, 65, 66
See application file for complete search history.

(56) References Cited

U.S. PATENT DOCUMENTS 5,998,858 A * 12/1999 Little et al. .................. 257/678
8,573,989 B2 11/2013 Lambert et al.
2009/0321302 A1 12/2009 Dubois et al.

FOREIGN PATENT DOCUMENTS

EP 1927931 A1 6/2008
FR 2906623 A1 4/2008
FR 2944625 A1 10/2010

OTHER PUBLICATIONS

French Search Report dated Nov. 27, 2013 for corresponding French Application No. 1353320, filed Apr. 12, 2013.

* cited by examiner

*Primary Examiner* — Javaid Nasri
(74) *Attorney, Agent, or Firm* — David D. Brush; Westman, Champlin & Koehler, P.A.

(57) ABSTRACT

A system is provided for protecting a signal within an electronic device. Such a system includes a connector and a printed circuit. The connector has a generally rectangular parallelepiped shape and includes: at its base, at least one solder termination corresponding to a contact region conveying the signal to be protected; and a slot for inserting a printed circuit. The printed circuit is housed in the insertion slot and shaped so that it covers the solder termination.

7 Claims, 4 Drawing Sheets

SYSTEM FOR PROTECTING A SIGNAL WITHIN AN ELECTRONIC DEVICE, RELYING ON AN INSERTION OF A PRINTED CIRCUIT IN AN INSERTION SLOT OF A CONNECTOR

1 FIELD OF THE INVENTION

The present invention pertains to the field of the protection of memory-card reading devices or "memory-card readers". Such memory-card reading devices are used in numerous apparatuses such as payment terminals, devices for authentication or identification or again devices for reading contents.

The present invention relates more particularly to the securing of such memory-card reading devices so that signals exchanged within the terminal cannot be picked up or monitored.

2 PRIOR ART

Apparatuses that integrate memory-card reading devices, such as payment terminals, comprise numerous devices for securing and they apply numerous methods to ensure that the apparatuses are used for the purposes for which they are planned, and comply with the security norms laid down by certification organizations.

For example, in the field of payment terminals for smart cards, the manufacturers are required, since May 1, 2011, to comply with the PCI PED 3.0 (Payment Card Industry Pin Entry Device) standard.

This security standard consists especially in securing the entry keypad of the terminals by protecting the confidential code or PIN code entry operation and blocking the terminal in the event of (fraudulent or accidental) intrusion.

There are known prior-art systems used to protect electronic circuits. These systems include devices aimed at preventing one or more given signals from being compromised. Such systems are implemented for example in payment terminals in order to prevent attacks on specifically identified parts within the terminal. A device of this type is described for example in the patent application FR 2944625. This device takes the form of a unit with a generally rectangular parallelepiped shape, comprising several superimposed printed circuit layers, connected together by means of buried via holes. It takes the form of an electronic component that can be electrically connected to a printed circuit on which it is mounted. It also comprises a protrusion for blocking access to contact points through the top of the component. This component is efficient and fulfils its function of protection. However, it raises at least two problems. The first problem relates to the positioning of the component on the printed circuit. Indeed, this electronic component has to be positioned after the others. This assumes that there is a particular mode of assembly, which entails additional costs. The second problem relates to the fact that this component is a particular component that must be produced in relatively small batches, and this makes it a costly component. It is therefore not possible, or reasonable, to use this component without quite considerably increasing the cost of the terminal.

There is therefore a need for an approach that that offers protection at least equivalent to the protection offered by this prior-art device while at the same minimizing or eliminating its drawbacks.

3 SUMMARY OF THE INVENTION

The proposed system does not have these drawbacks of the prior art. Indeed, the proposed system takes the form of a connector associated with a printed circuit. More particularly, the invention pertains to a system for protecting a signal within an electronic device. According to the invention, such a system comprises:

a connector with a generally rectangular parallelepiped shape comprising:
  at its base, at least one solder termination corresponding to a contact region conveying said signal to be protected;
  a slot for inserting a printed circuit;
  a printed circuit which gets housed in said insertion slot and is shaped so that it covers said solder termination.

Thus, the invention makes it possible to protect the access to the sensitive signals without the need of a complementary protection device. In other words, the printed circuit acts as a protection shield.

According to one particular embodiment, said printed circuit which gets housed in said insertion slot and is shaped so that it covers said solder termination is a flexible printed circuit.

Thus, the shaping of the printed circuit acting as a protection shield is facilitated.

According to one particular embodiment, said insertion slot and said at least one solder termination are disposed on a same face of said connector.

Thus, the shaping of the printed circuit is made simpler.

According to one particular embodiment, at least one second solder termination is disposed on a face opposite that of said slot for inserting said connector.

According to one particular characteristic, said printed circuit comprises, on at least one of its faces, at least one protection layer.

According to one particular embodiment, said at least one protection layer comprises a latticed electric circuit.

Thus, the printed circuit cannot be pierced in order to access the protected signal.

According to one particular embodiment, said connector is a micro SD type connector.

According to one particular embodiment, said connector comprises at least two contact regions, said at least two contact regions being aligned, one before the other, in the sense of the withdrawal of said printed circuit.

Thus, a fraudulent or unauthorized withdrawal of the printed circuit can be detected.

4 FIGURES

Other features and advantages of the invention shall appear more clearly from the following description of a preferred embodiment, given by way of a simple, illustrative and non-exhaustive example, and from the appended drawings, of which:

5 DETAILED DESCRIPTION OF THE INVENTION

5.1. Reminder of the Principle of the Invention

As explained here above, rather than have a particular electronic component that protects a predefined region, the proposed system, which can be likened to a connector, directly incorporates the desired protection. This approach on the one hand does not necessitate the building of a particular component and, on the other hand, facilitates assembly. More particularly, the proposed system is called an FPC (flexible printed circuit) connector because it is really the association between a connector and a printed circuit (which can be flexible or not, depending on the embodiments) that resolves the problems referred to here above.

To accurately assess the contribution of the proposed system, the technical problem on which the previously proposed solution is based needs to be reformulated. In terminals, and more particularly in payment terminals, connectors are used to connect components or elements to each other. For example, memory card connectors are used to make a connection between the chip of a smart card and the printed circuit of the terminal. A connector is also used to connect a magnetic reading head to the printed circuit of the terminal. Other connectors are used to connect various parts of the terminal to each other (for example the main mother board and additional boards such as the communications boards, or a display unit and a main board).

A connector usually takes the form of a part, often made of plastic, within which there are laid out metal contacts (or at least conductors) by which the elements can be electrically connected. These metal contacts can also be called pins. The connector is either directly connected to the printed circuit, as in the case of a memory-card connector, or connected to the printed circuit by means of a cable, which is more infrequent. At the base of the connector, the solder terminations are:

either directly soldered onto the printed circuit at the place where they are laid (as surface-mounted components or SMCs);

or positioned in holes and soldered by the rear, i.e. on the other face of the printed circuit (via components or "pin in paste" components).

Figure 1:
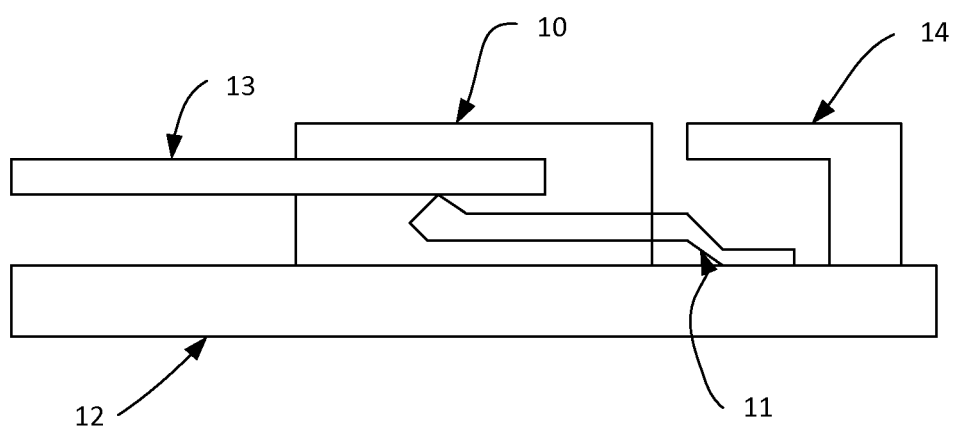
FIG. 1 illustrates the protection systems of the prior art.

Now, the use of these connectors raises a problem. Although they are practical, these connectors give rise to problems of security. To be able to intercept the information that travels between the elements connected by the connector, all that a hacker needs to do is to succeed in introducing a conductive wire into the terminal, at one or more of the metal solder terminations of the connector. The access to these metal solder terminations therefore needs to be protected. This is what the prior-art systems try to do, as for example in the system described in the patent FR 2944625. The problems and issues involved can be understood more clearly from FIG. 1. In the classic configuration, a connector 10 (which can be connected at the same time to a display unit, a magnetic head or an inter-card link) is constituted by at least one contact comprising a solder termination 11 bonded or soldered to a printed circuit 12. Of these contacts, at least one has to be protected (inter-CPU signals, I/O signals, magnetic head analog signals). In the prior art, a classic connector 10 is used. A ribbon 13 is connected to the connector 10 and comes into contact with at least one connector 10. The connector 10 is secured by protecting the portion of the connector in which the solder termination to be protected is located, via a part called an "I/O cover" or a "connector cover" 14. These approaches have several drawbacks:

the protection signals need to be secured;

this circuit needs to be soldered by reflow soldering, with signals that are concealed and not always very easy to master (especially for trouble-shooting, when the means of industrial production are not always available to carry out this work);

this I/O cover is a specific component, made as a PCB, cut out in a non-traditional manner (with a semi-incision to make a shoulder);

the price is not negligible;

the reliability can be unpredictable, especially when the ambient humidity level is high.

The invention provides a simple and elegant solution to these problems: it is enough to use a printed circuit to cover the conductive solder terminations. This makes it no longer necessary to have a component specially shaped to protect the conductive solder terminations. The use of the printed circuit, which must be inserted into the connector, efficiently protects the conductive solder terminations.

5.2. Description of Embodiments

Figure 2A:
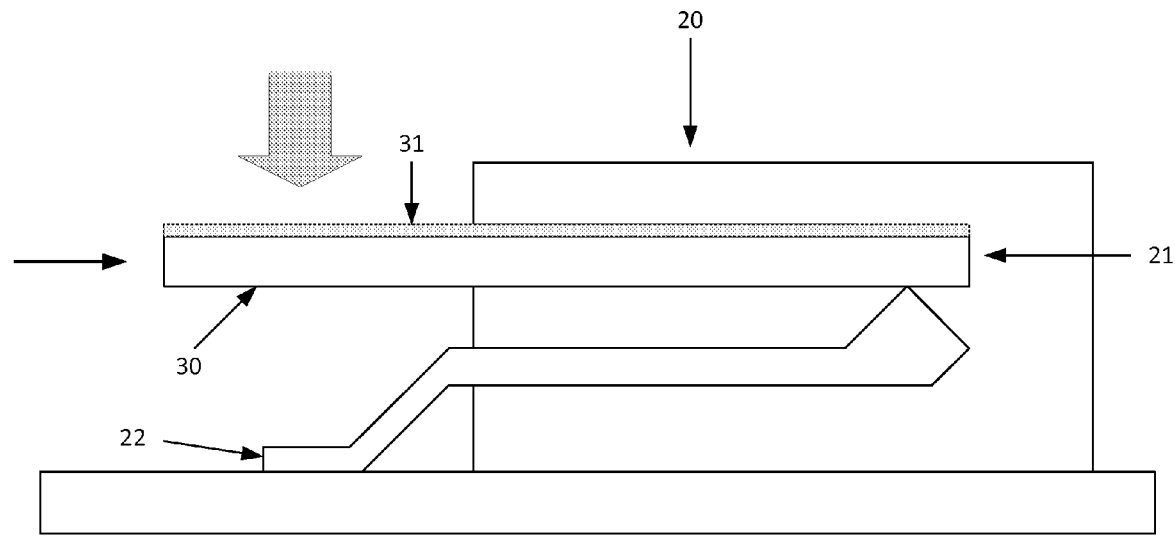
FIGS. 2a and 2b illustrate a first implementation of a system of protection.
Figure 2B:
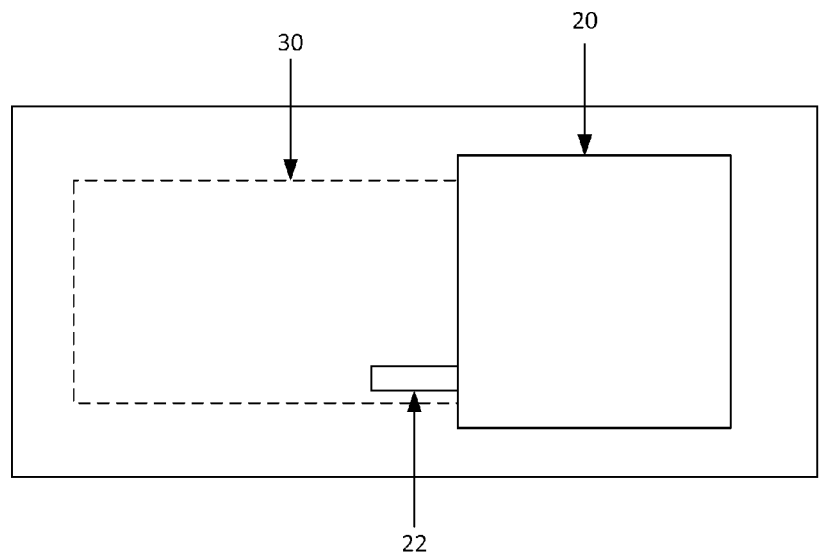

In a first embodiment, in order to ensure a protection of the solder terminations of the connector, the printed circuit is oriented in the same sense as the pins. In this way, the pins which are soldered or fixed to the printed circuit, are covered by the printed circuit. Referring to FIGS. 2a and 2b, this first embodiment is described. The connector 20 has a generally rectangular parallelepiped shape. It has an insertion slot 21 enabling the insertion of a printed circuit 30 (which can be flexible or, again, a rigid printed circuit). It also has at least one solder termination 22. As shown in the figures, the solder termination exits from the connector 20 beneath the insertion slot 21. This means that the printed circuit 30, once connected, is situated above the solder termination 22. The solder termination 22 is therefore protected, from the top, by the printed circuit 30. In other words, in this embodiment, the connector used has solder terminations (the solder terminations) which are situated on the same side as the insertion slot of the connector 20. In this first embodiment, the printed circuit 30 thus covers the solder termination to be protected without any need to provide for an additional protection component.

In a second embodiment, also presented with reference to FIGS. 2a and 2b, the printed circuit 30 furthermore has a protective lattice 31. This protective lattice 31 gives protection against unauthorized access or piercing of the printed circuit to attack the solder termination 22. Thus, the combination of a printed circuit comprising a protective lattice with the connector offers the same degree of securing as the use of an additional component.

Figure 3:
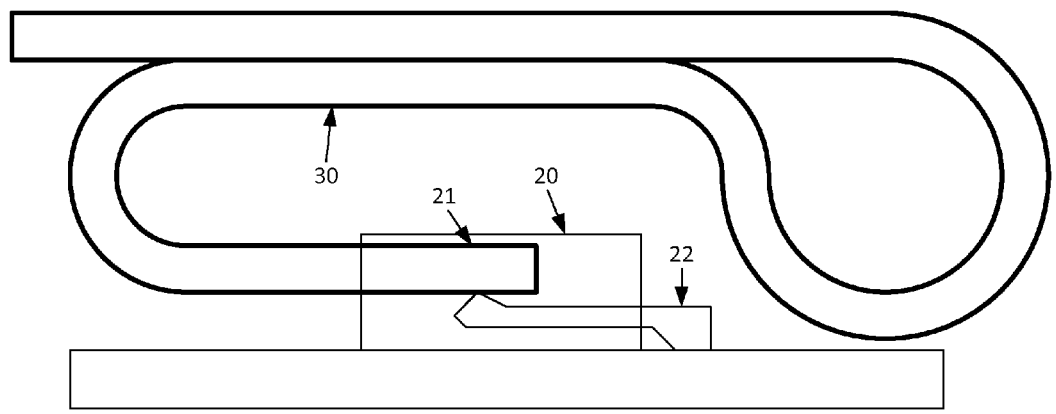
FIG. 3 illustrates another embodiment of the system of protection.

In a third embodiment, described with reference to FIG. 3, the connector 20 used has solder terminations (the solder terminations) that are situated on the side opposite the insertion slot for the connector 20. In this case, the printed circuit 30 is a flexible printed circuit that is shaped to cover the solder termination or terminations to be protected.

5.3. Description of a Particular Connector

Figure 4:
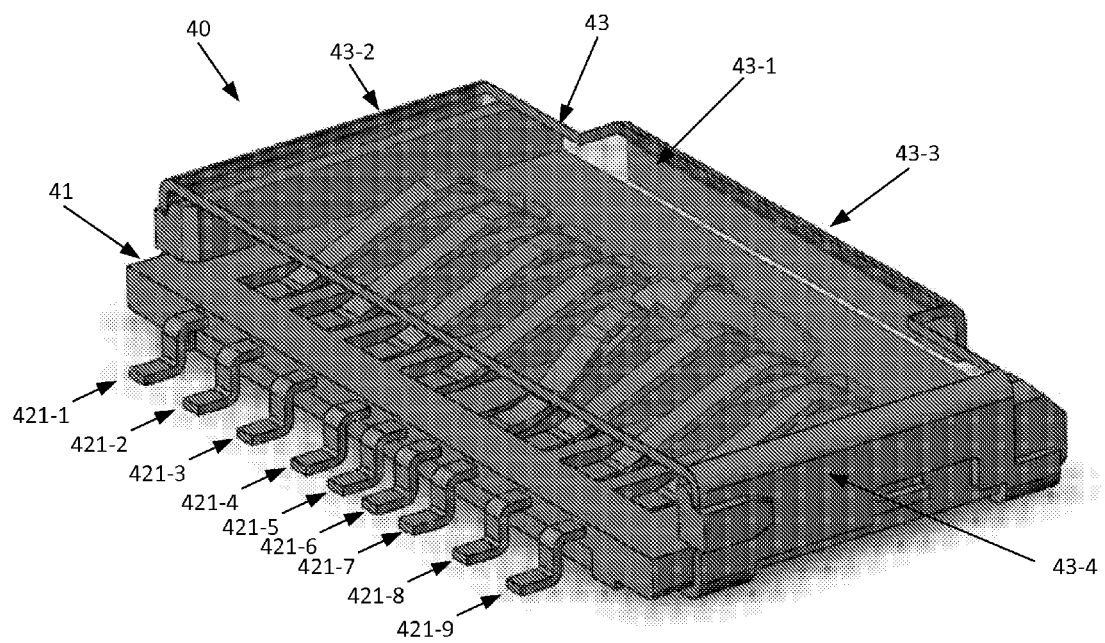
FIG. 4 illustrates an embodiment of a connector intended for the system of protection according to the invention.
Figure 5:
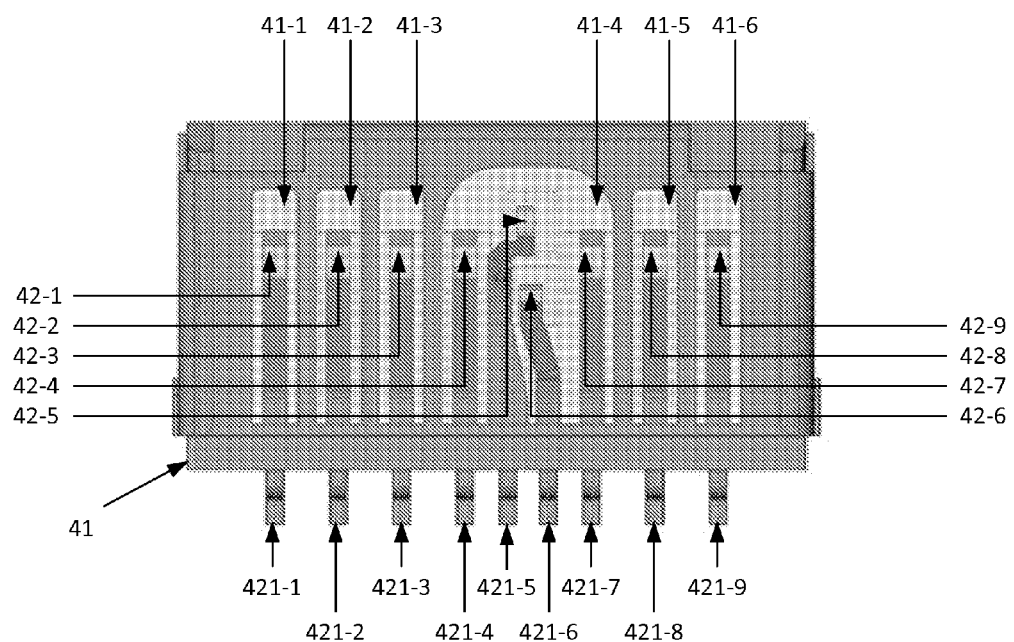
FIG. 5 illustrates the internal architecture of the connector presented in FIG. 4, with respectively the position of the contact regions.

Referring to FIGS. 4, and 5, we describe a particular connector intended for use in the context of a system according to the invention. This is a connector (40) having a generally rectangular parallelepiped shape.

The connector (40) comprises a rectangular base (41) to which a rigid cover element (43) is fixed. In FIG. 4, the cover element (43) is shown transparently. In FIGS. 5a and 5b, this rigid cover element is not shown.

The rectangular base (41) comprises rectangular holes (41-1 to 41-6) in which there are inserted contact regions (42-1 to 42-9) on conductive strips (for example made of metal). These conductive strips are extended by solder terminations (421-1 to 421-9) which go beyond the rectangular base (41) and enable the contact regions of the connector (40) to be connected to a printed circuit (such as for example a mother board of a terminal).

The rigid covering element (43) comprises a rectangular surface (43-1) appreciably of the same size as the rectangular base of the connector. The rigid covering element (43) also has three sides (43-2 to 43-4) enabling the creation of a slot for inserting a flexible piece. Depending on the way in which the rigid covering element (43) is positioned on the rectangular base (41), the insertion slot can be on the same side as the solder terminations or on the opposite side. In the embodiment now presented, the insertion slot and the solder terminations are on the same side.

In addition to the above characteristics, in this embodiment, at least two contact regions (42-5, 42-6) are aligned in the sense of introduction of the printed circuit (or smart card). This alignment makes it possible to detect the withdrawal of the printed circuit (or smart card), by a motion of translation and to produce a short-circuit between the two contact regions (42-5, 42-6). Thus, any attempt to fraudulently withdraw the printed circuit (or the smart card) can be prevented and suitable security measures can be applied.

Indeed, one of the difficulties with the system of the invention is that of preventing a withdrawal of a flexible or rigid printed circuit that has been inserted into the slot. Now, if this withdrawal can be done without difficulty, the protection offered by the invention can be of lesser interest. As indicated here above, in this particular embodiment, two regions of contact are aligned in the sense of the insertion. As can be seen in FIG. 5, this implies that the contact regions of the printed circuit that is inserted into the slot (for example the flexible printed circuit) are offset in order to come into contact with the contact region provided for this purpose on the connector. During an unauthorized withdrawal, the contact region (called FPC region) of the printed circuit (for example the flexible printed circuit), which has undergone an attempted withdrawal, comes into contact with the region 42-6. In normal use, this FPC region is in contact with the region 42-5. Since the regions 42-5 and 42-6 are aligned, the FPC region is obligatorily connected during the withdrawal, at a given point in time, with the region 42-6. Thus, during this contact, a short-circuit is detected. This short-circuit makes it possible to activate appropriate protection steps.

5.4. Description of a Second Particular Connector

Figure 6:
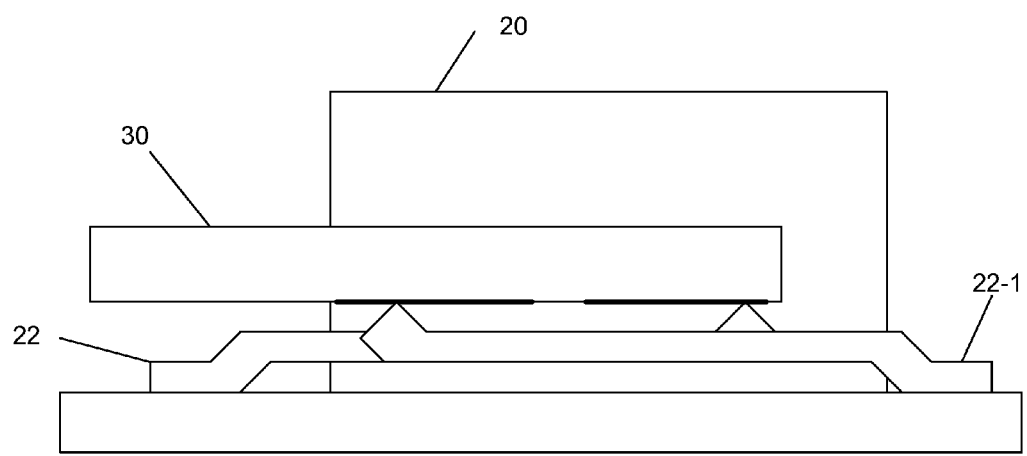
FIG. 6 illustrates a simplified architecture in another embodiment.

Another embodiment of the invention, described with reference to FIG. 6, and for which the previous reference numbers are kept, uses a principle identical to the one presented here above for the connector 40. Unlike the connector 40 however, this embodiment implements an offset connector. The principle is the following: rather than having to design a connector with at least two regions aligned in the sense of insertion and withdrawal of the printed circuit, the invention uses an offset connector, comprising solder terminations 22 extending on the printed circuit insertion side and solder terminations 22-1 extending on the opposite side. In this embodiment, the contact regions coming from the strips, the solder terminations 22 of which are on the insertion side, are used to transmit the signal. These solder terminations are therefore protected by the printed circuit 30 which is inserted into the insertion slot. The contact regions which come from the strips, the solder terminations 22-1 of which are on the side opposite the insertion side, are connected to ground. During an unauthorized withdrawal of the printed circuit, the contact region associated with the front strips is no longer in contact with the corresponding front strip. Thus the fact that this contact region is no longer in contact with the front strip can be detected. It is therefore possible to activate securing steps at detection.

In addition, this contact region associated with the front strips would be in contact, during the movement, with the rear strip. It is thus possible to detect a break in contact and/or the setting up of an unauthorized contact.

The invention claimed is:

1. A system for protecting a signal within an electronic device, wherein the system comprises:
   a connector with a generally rectangular parallelepiped shape comprising:
      at a base of said connector, at least one solder termination corresponding to a contact region conveying said signal to be protected; and
      a printed circuit insertion slot; and
   a printed circuit housed in said insertion slot and being shaped so that the printed circuit covers said solder termination, said printed circuit comprising at least one protection layer on at least one face of said printed circuit.

2. The system for protecting according to claim 1, wherein said printed circuit is a flexible printed circuit.

3. The system for protecting according to claim 2, wherein at least one second solder termination is disposed on a face of said connector opposite that of said insertion slot.

4. The system for protecting according to claim 1, wherein said insertion slot and said at least one solder termination are disposed on a same face of said connector.

5. The system for protecting according to claim 1, wherein said at least one protection layer comprises a latticed electric circuit.

6. The system for protecting according to claim 1, wherein the connector is a micro SD type connector.

7. The system for protecting according to claim 1, wherein said connector comprises at least two contact regions, said at least two contact regions being aligned, one before the other, in the sense of the withdrawal of said printed circuit.

* * * * *